Figure 1:
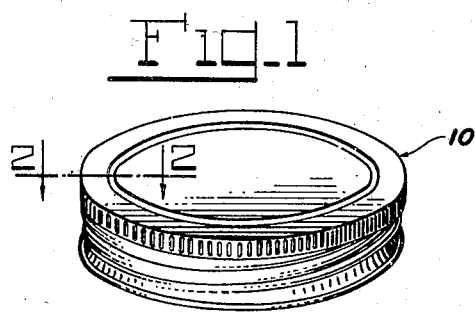

Dec. 21, 1948.  H. G. MAEDER, JR., ET AL  2,456,972
CONTAINER CLOSURE
Filed Aug. 24, 1945

Inventors
Henry G. Maeder Jr.
Morgan R. Day
By Theodore C. Browne
Attorney

Patented Dec. 21, 1948

2,456,972

UNITED STATES PATENT OFFICE 2,456,972

CONTAINER CLOSURE

Henry G. Maeder, Jr., Belmont, and Morgan R. Day, North Scituate, Mass., assignors to Dewey and Almy Chemical Company, North Cambridge, Mass., a corporation of Massachusetts Application August 24, 1945, Serial No. 612,420

8 Claims. (Cl. 215—40)

This invention is concerned with container closures. Although it is useful for can closures and closures of other types, it is particularly adapted to the manufacture of closures for glass jars, where, because of the increased thickness of the gasket, drying causes severe problems.

The common can end and the closures for glass jars are made from metal discs having a groove or channel formed close to the periphery. The metal blanks are placed in an automatic machine which feeds them singly onto a revolving chuck, then as the blank revolves, a stream of "compound" is ejected through a nozzle into the channel of the blank. This operation is known as "lining."

The liquid composition which is forced through the nozzle, is fundamentally rubber, or its artifical equivalent, made into a liquid by one of two techniques. It may be a disperson in which case tiny particles of rubber are suspended in a non-solvent for rubber—usually water, or it may be a specialized "solution" in which case the rubber is dissolved or, more properly, solvated by an organic solvent. Closures for tin cans use both types of compounds. Closures for glass jars, where much greater thicknesses of sealing substances are required, use the water dispersion type of compound. The reason is that dispersions can be made with a high proportion of solids and low viscosities. Solutions rapidly increase in viscosity and with a solids concentration high enough to be useful in glass closures, have a viscosity so high that the compound can not be applied by pneumatic machinery. But whether the compound be a dispersion or a solvent solution, the lining is converted into a solid gasket mass in the channel of the lined closure by driving off the suspending medium (the water) or the solvating substance (the solvent).

Millions of can closures have been made by the above process with great satisfaction, but it has defects when closures for glass containers are made, for unless the drying is planned with great care and the operation expertly supervised, cracks, checks, blow holes and pits appear in the lining, most of which are caused by the vaporization of the liquid from layers deep in the film. At the worst, all forms of defects may appear in one lining, but it is the common experience that specific compounds run to specific defects. For example, cracks and checks are most commonly found in water-base compositions; blow holes and pits commonly occur in solvent-base linings.

Since it is necessary that each closure seal a jar hermetically, these defects make the closure useless.

We have determined that the root of the trouble lies in the fact that all prior compounds progressively approach a solid state as they are progressively dried. In consequence, a bubble or a crack once formed is permanent and persists as a void in the seal.

Our invention produces void-free seals which are free from surface and internal defects. It speeds the drying and solidification of the seals and requires less care and a lesser degree of watchfulness in drying, and, in addition, it produces closures having a high degree of resilience in the sealing element.

Broadly, we accomplish these results by adding to the compound chemical peptizing agents which act even after the evaporation of the water or the solvent to cause the liquefaction of the rubber substance. These substances are presumed to convert the gel fraction of the rubber temporarily before vulcanization to the sol form and in this sense are distinguished from solvents which cause solution of the rubber or prolonged milling or heating which causes its depolymerization. We allow this liquid state to continue long enough to allow the viscous flow and surface tension of the peptized rubber to cause the coalescence of the rubber sealing mass. Thereafter, by heating, we bring about the conversion of the liquefied rubber into a solid, homogeneous, vulcanized mass. The class of rubber peptizing agents contains many substances and many of the recognized peptizing agents may be used. We prefer, because of superior effectiveness, to use the alkylthiuram disulphides together with the piperidinium alkyl dithiocarbamates. These exert a profound peptizing effect on natural rubber and chlorobutadiene-1,3, and are also effective on other elastomeric polymers such as butadiene-styrene and butadiene-acrylonitrile. The point of liquefaction depends upon the concentration of these agents and the specific polymer. But it may be conveniently additionally controlled by adding a plasticizer such as a phthallate, sebacate, a nephenic base distillate, etc.

The sealing compounds are first made liquid either by dissolving the composition in an organic solvent or by dispersing the composition in water or other dispersing medium. The liquid composition is applied to the channel of the closure blank by the normal machinery now used for lining caps and can ends. The wet, lined closures are then placed in an oven maintained at from 150° F. to 250° F. At these temperatures the liquid component of the compound (the solvent or the water) is driven off. It is of no moment if, at this time, defects such as blisters, cracks, checks or pits appear because of these temperatures the peptizing agents have chemically liquefied the rubber. Because no vaporizable substance is left and the rubber is a liquid, some rubber drains from the walls of the channel. This drainage together with the normal viscous, liquid flow causes the defects of vapor blowing or shrinkage to disappear. After the "smoothing out" is completed, the temperature is raised. This is conveniently done by passing the lined closures to another zone in the oven. They may be placed in another drying oven. At temperatures between 250° F. and 300° F. the compound is rapidly converted into a solid pit- and void-free vulcanizate.

As a specific example of our invention:

Example I

| | Parts |
|---|---|
| Polymerized 2-chloro butadiene-1,3 (Neoprene KNR) | 500 |

Polymerized 2-chloro butadiene-1,3 containing a halogenated wax "Neoprene KNR" is more susceptible to the action of chemical peptizing agents than other types of chlorobutadiene polymers

| | |
|---|---|
| Paraffin wax (M. P. 125° F.) | 68 |
| Light calcined magnesia | 20 |
| Carbon black | 2 |
| Georgia hard clay | 300 |
| Sym. di-beta-naphthyl - para-phenylenediamine | 10 |

These are milled together on cold rubber rolls until a smooth working sheet is produced. The above compound is placed in a Baker-Perkins type of mixer and:

| | Parts |
|---|---|
| Tetramethyl thiuram disulphide | 12.5 |
| Piperidine pentamethylene dithiocarbamate | 10.0 |
| Zinc oxide | 25.0 |
| Dibutyl sebacate | 250.0 | are added. A total of 515 parts of benzol are added in small amounts as the churning continues. The total solids of this solution is 70%.

This composition is lined on closures as has been described. The closures are heated for 15 minutes at 250° F. to remove the benzol. They then are held for 5 minutes more at 250° F. to allow the film to coalesce and then are vulcanized for 15 minutes at 300° F.

The drawing illustrates the invention as applied to three types of glass closures.

Figure 2:
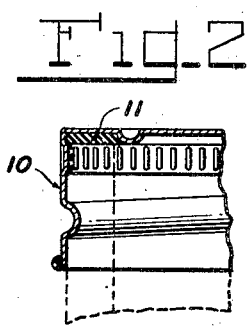
Figure 3:
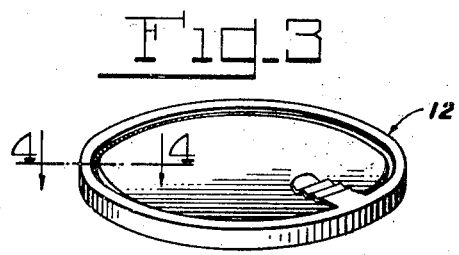
Figure 4:
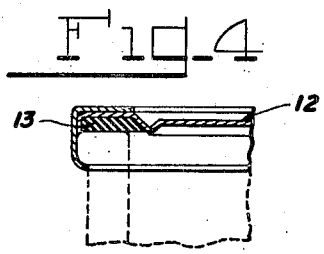
Figure 5:
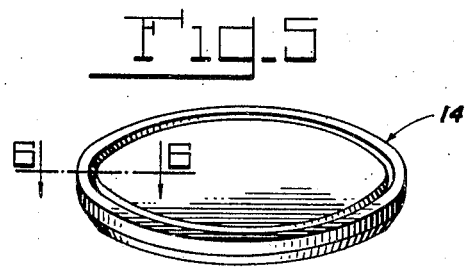
Figure 6:
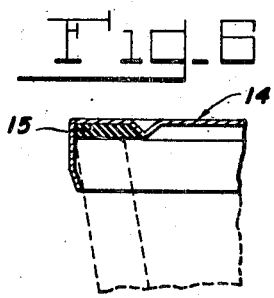

Figure 1 shows a screw cap 10;
Figure 2 is a sectional view of the cap 10 on the line 2—2 of Figure 1;
Figure 3 shows a band cap 12;
Figure 4 is a sectional view of the cap 12 on the line 4—4 of Figure 3;
Figure 5 shows a tumbler cap 14;
Figure 6 is a sectional view of the cap 14 on the line 6—6 of Figure 5.

Example II

| | Parts |
|---|---|
| Polymerized 2-chloro butadiene-1,3 (Neoprene KNR) | 500 |
| Sym. di-beta-naphthyl - para-phenylenediamine | 10 |
| Light calcined magnesia | 20 |
| Zinc oxide | 25 |
| Georgia hard clay | 300 | are milled together on cold rubber rolls until a smooth working sheet is produced. 855 parts of the above compound is placed in a Baker-Perkins type of mixer, and

| | Parts |
|---|---|
| Piperidine pentamethylene dithiocarbamate | 10.0 |
| Tetramethyl thiuram disulphide | 12.5 |
| Dibutyl sebacate | 250.0 | are worked into the mixture. The plastic product of this mixing operation may be dispersed in water by adding to 1000 parts of the plastic batch

| | Parts |
|---|---|
| Red oil | 35 |
| Water | 125 | and after the water has been taken up, a solution of:

| | Parts |
|---|---|
| Sodium salt of isopropyl naphthalene sulphonate | 20 |
| Caustic potash | 10 |
| Water | 100 |

As the final step, 10 parts of the sodium salt of the formaldehyde condensation product of naphthalene sulphonic acid and sufficient water is added to bring the solids contents of the dispersion to 70%.

30 parts of butyraldehyde-mono-butylamine and 188 parts of water are later stirred into 1500 parts of the above emulsion in any suitable liquid mixing apparatus.

If the above compound is lined in a 70 mm. glass container closure to give a total wet weight of 2250 mgrs., this mass requires from 1 to 1½ hours at 160° F. to dry. It is vulcanized for one hour at 260° F. The butyraldehyde-mono-butylamine may be omitted, but in this case, the vulcanization time required is 30 minutes at 300° F.

Example III

| | Parts |
|---|---|
| Rubber (Goodrich Amber Blanket) | 500.0 |
| Sodium acetate | 7.5 |
| Light calcined magnesia | 20.0 |
| Sym. di-beta-naphthyl-para-phenylenediamine | 10.0 |
| Paraffin wax | 80.0 |
| Clay (Bucca) | 400.0 |
| Iron oxide | 100.0 |

The compounding materials are added to the rubber on the mill and milling is continued for approximately 10 minutes. The milled sheet is then placed in a Baker-Perkins type of mixer and the following materials are added:

| | Parts |
|---|---|
| Phenylhydrazine | 5.0 |
| Tetraethyl thiuram disulphide | 12.5 |
| Piperidinium pentamethylene dithiocarbamate | 10.0 |
| Zinc oxide | 25.0 |
| Dibutyl sebacate | 375.0 |
| Solvesso #1 [1] | 1020.0 |

[1] Trade name for a solvent furnished by Standard Oil Company of New Jersey having the approximate composition: toluene 66%, xylol 6%, solvent naphtha 28%.

Mixing in the Baker-Perkins type of mixer is continued until a smooth fluid mass results.

The solvent in the above composition is driven off after caps are lined by exposing the wet film to a temperature of about 150° F. for 20 to 30 minutes after which the temperature is raised to 225° F. for 15 minutes to convert the solvent-free chemically liquefied rubber into a solid vulcanized mass.

As the above examples show, it is immaterial whether dispersions in which the ingredients are suspended in water or solutions in which the rubber is solvated are used. Accordingly, in the specification and in the claims, we have used the term "vaporizable liquid" to include both water and organic rubber-solvent liquids. The word "rubber" is used generically to include both natural rubber and artificial elastomeric polymers.

Solvent compositions made by this invention for the first time make it possible to apply the thick layers of compound necessary for glass container closures by the simple and automatic lining machine practice. Previously, solvent compounds have been applied to glass closures only in the form of thick pastes or doughs which have been rolled or scraped into the channel. The lining of a liquid compound is a faster, cheaper and simpler process.

The closures made by this process exhibit a high degree of resilience, a characteristic which is very desirable when sealing glass containers since the containers are dimensionally much more inaccurate than are metal cans. The resilience of the seal compensates for the inaccuracy in the dimensions of the glass finish.

We claim:

1. A container closure including a closure element and a self-adherent solid, pit-free vulcanized sealing element, the latter being the reaction product of a vulcanizable elastomeric polymer, a vulcanizing agent, and a rubber peptizer in the presence of a plasticizer, the peptizer being in proportion sufficient to have liquefied the polymer at a temperature above 68° F.

2. A container closure as defined in claim 1 in which the rubber peptizer consists essentially of substantially equal weights of an alkyl-thiuram disulphide and a piperidinium alkyl dithiocarbamate in proportion amounting to about 4 percent of the weight of the elastomeric polymer.

3. The method of producing a pit-free container closure which comprises providing a liquid vulcanizable rubber composition having a solids content of about 70 to 82% containing a vulcanizable elastomeric polymer, a vaporizable liquid solvent for the polymer, a plasticizer and a rubber peptizer, the latter in quantity sufficient to liquefy the polymer at elevated temperature after removal of the solvent, applying the composition in liquid condition to the channel of a closure blank, heating the composition to a temperature of approximately 250° F. for approximately 20 minutes to vaporize said solvent, continuing the heating of the resulting solvent-free unvulcanized liquid mass for a time sufficient to cause the mass to flow into a continuous bubble-free condition, and then heating the mass to approximately 300° F. for approximately 15 minutes to convert it into a solid vulcanizate.

4. The method of producing a pit-free container closure which comprises providing a liquid vulcanizable rubber dispersion having a solids content of about 62% and containing a vulcanizable elastomeric polymer, water, a plasticizer and a rubber peptizer, the latter in quantity sufficient to liquefy the polymer at elevated temperature after removal of the water, applying the composition in liquid condition to the channel of a closure blank, heating the composition to a temperature of approximately 160° F. for approximately 90 minutes to vaporize the water, continuing the heating of the resulting water-free unvulcanized liquid mass for a time sufficient to cause the mass to flow into a continuous bubble-free condition, and then heating the mass to approximately 260° F. for approximately 60 minutes to convert it into a solid vulcanizate.

5. The method of producing a pit-free container closure which comprises providing a liquid vulcanizable rubber composition containing a vulcanizable elastomeric polymer, a vaporizable liquid component, a plasticizer and a rubber peptizer, the latter in quantity sufficient to liquefy the polymer at elevated temperature after removal of the vaporizable liquid component, applying the composition in liquid condition to the channel of a closure blank, converting the composition into a liquid mass free of said vaporizable liquid components by heating the composition to a temperature and for a time sufficient to vaporize said vaporizable liquid component but insufficient to effect substantial vulcanization of the polymer, maintaining the resulting unvulcanized, liquid polymeric mass at a temperature at which it remains liquid but below its vulcanizing temperature for a time sufficient to permit the mass to flow into a continuous bubble-free condition and finally raising the temperature of the mass to its vulcanizing temperature and maintaining said temperature until the mass is vulcanized.

6. Process as defined in claim 5 in which the vaporizable liquid component is a rubber solvent.

7. Process as defined in claim 5 in which the vaporizable liquid component is water.

8. The process as defined in claim 5 in which the rubber peptizer consists essentially of substantially equal weights of an alkyl-thiuram disulphide and a piperidinium alkyl dithiocarbamate in proportion amounting to about 4 percent of the weight of the elastomeric polymer.

HENRY G. MAEDER, Jr.
MORGAN R. DAY.

REFERENCES CITED

The following references are of record in the file of this patent:

UNITED STATES PATENTS

| Number | Name | Date |
|---|---|---|
| 1,738,612 | Recht | Dec. 10, 1929 |
| 1,861,589 | Warth | June 7, 1932 |
| 2,064,580 | Williams | Dec. 15, 1936 |
| 2,190,587 | Williams | Feb. 13, 1940 |
| 2,269,441 | De Holczer | Jan. 13, 1942 |

Certificate of Correction

Patent No. 2,456,972.  December 21, 1948.

HENRY G. MAEDER, Jr., ET AL.

It is hereby certified that errors appear in the printed specification of the above numbered patent requiring correction as follows:

Column 2, line 46, for "nephenic" read *naphthenic*; column 3, line 4, for the words "of these" read *at these*; column 5, line 32, claim 1, after the syllable "ized" insert *rubber*;

and that the said Letters Patent should be read with these corrections therein that the same may conform to the record of the case in the Patent Office.

Signed and sealed this 17th day of May, A. D. 1949.

[SEAL]

THOMAS F. MURPHY,
*Assistant Commissioner of Patents.*